United States Patent
Duan (10) Patent No.: US 10,846,460 B2
(45) Date of Patent: Nov. 24, 2020

(54) METHOD AND APPARATUS FOR LAUNCHING APPLICATION PAGE, AND ELECTRONIC DEVICE

(71) Applicant: GUANGDONG OPPO MOBILE TELECOMMUNICATIONS CORP., LTD., Guangdong (CN)

(72) Inventor: Yaohui Duan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/193,839

(22) Filed: Nov. 16, 2018

(65) Prior Publication Data

US 2019/0251144 A1    Aug. 15, 2019

(30) Foreign Application Priority Data

Feb. 13, 2018   (CN) .......................... 2018 1 0150632

(51) Int. Cl.
*G06F 17/00* (2019.01)
*G06F 40/134* (2020.01)
*G06F 16/955* (2019.01)
*H04N 21/00* (2011.01)
*G06F 9/451* (2018.01)
(Continued)

(52) U.S. Cl.
CPC ........ *G06F 40/134* (2020.01); *G06F 9/44505* (2013.01); *G06F 9/451* (2018.02);
(Continued)

(58) Field of Classification Search
CPC .. G06F 16/951; G06F 17/2235; G06F 40/134; G06F 9/451
(Continued)

(56) References Cited

U.S. PATENT DOCUMENTS 8,918,712 B2    12/2014  Nario et al.
9,348,935 B2 *   5/2016  Doig ................... G06F 16/9535
(Continued)

FOREIGN PATENT DOCUMENTS

CN    103443816    12/2013
CN    104572953     4/2015
(Continued)

OTHER PUBLICATIONS

EPO, Office Action for EP Application No. 18210659.1, dated Jul. 11, 2019.
(Continued)

*Primary Examiner* — Manglesh M Patel
(74) *Attorney, Agent, or Firm* — Hodgson Russ LLP (57) ABSTRACT

The present disclosure provide a method and an apparatus for launching an application page, and an electronic device. The method includes: obtaining item description information in a current display interface, the item description information comprising text description information, image description information and/or speech description information; determining an item type of an item according to the item description information; obtaining an application identification corresponding to the item type; obtaining a configuration file corresponding to the application identification from a server, and generating a hyperlink on the current display interface, the hyperlink being associated with the configuration file; and when a trigger operation on the hyperlink is detected, launching a target application page according to the configuration file.

18 Claims, 8 Drawing Sheets

(51) Int. Cl.
  *G06F 9/445* (2018.01)
  *G06F 16/951* (2019.01)
  *G06F 9/455* (2018.01)
  *G06F 40/279* (2020.01)
  *G10L 15/26* (2006.01)
  *G06K 9/62* (2006.01)
  *G06Q 30/06* (2012.01)

(52) U.S. Cl.
  CPC ........ *G06F 9/45529* (2013.01); *G06F 16/951* (2019.01); *G06F 16/9558* (2019.01); *H04N 21/00* (2013.01); *G06F 40/279* (2020.01); *G06K 9/6202* (2013.01); *G06Q 30/0623* (2013.01); *G10L 15/26* (2013.01)

(58) Field of Classification Search
  USPC ........................................ 715/208, 200, 234
  See application file for complete search history.

(56) References Cited

U.S. PATENT DOCUMENTS

2009/0138495 A1* 5/2009 Kalaboukis ........... G06F 16/986
  2013/0054356 A1* 2/2013 Richman ................ G06Q 30/00
                                                          705/14.49
  2014/0229812 A1* 8/2014 Fisher ................... G06F 16/951
                                                          715/208
  2015/0128017 A1  5/2015 Fithian et al.
  2015/0156061 A1  6/2015 Saxena et al.
  2016/0117388 A1  4/2016 Fan
  2017/0323337 A1 11/2017 Yang et al.
  2018/0027274 A1  1/2018 Wu et al.

FOREIGN PATENT DOCUMENTS

CN    105793879    7/2016
  CN    106790120    5/2017
  CN    107004122    8/2017
  CN    108319489    7/2018
  CN    106934047    1/2020

OTHER PUBLICATIONS

WIPO, English Translation of ISR/WO for PCT/CN2018/119481, Feb. 27, 2019.
  SIPO, First Office Action for CN Application No. 201810150632.4, dated Nov. 18, 2019.

* cited by examiner

METHOD AND APPARATUS FOR LAUNCHING APPLICATION PAGE, AND ELECTRONIC DEVICE

CROSS-REFERENCE TO RELATED APPLICATIONS

This application claims priority to Chinese Patent Application Serial No. 201810150632.4, filed on Feb. 13, 2018, the entire disclosure of which is incorporated herein by reference.

FIELD

The present disclosure relates to the field of electronic device technologies, and more particularly to a method and an apparatus for launching an application page, a storage medium and an electronic device.

BACKGROUND

At present, with the rapid development of terminal technologies, terminals such as smart phones have become more and more popular in people's life. The smart phone may be installed with various applications, such as camera applications, game applications, and map applications.

However, with more and more powerful functions of the applications, each application occupies greater and greater storage space, which influences normal operating of the system of the smart phone. The user needs to find the specified entry each time when he wants to the launch the application page, which is cumbersome to implement, resulting in a lower efficiency of launching the application page.

DISCLOSURE

Embodiments of the present disclosure provide a method and an apparatus for launching an application page, a storage medium and an electronic device, which may improve an efficiency of launching an application page.

In a first aspect, embodiments of the present disclosure provide a method for launching an application page. The method is applicable to an electronic device, and includes: obtaining item description information in a current display interface, the item description information including text description information, image description information and/or speech description information; determining an item type of an item according to the item description information; obtaining an application identification corresponding to the item type; obtaining a configuration file corresponding to the application identification from a server, and generating a hyperlink on the current display interface, the hyperlink being associated with the configuration file; and when a trigger operation on the hyperlink is detected, launching a target application page according to the configuration file.

In a second aspect, embodiments of the present disclosure provide an apparatus for launching an application page. The apparatus is applicable to an electronic device, and includes: a first obtaining module, configured to obtain item description information in a current display interface, the item description information including text description information, image description information and/or speech description information; a second obtaining module, configured to obtain an application identification corresponding to the item type; a first generating module, configured to obtain a configuration file corresponding to the application identification from a server, and generate a hyperlink on the current display interface, the hyperlink being associated with the configuration file; and a launching module, configured to launch a target application page according to the configuration file when a trigger operation on the hyperlink is detected.

In a third aspect, embodiments of the present disclosure provide a storage medium. The storage medium is stored thereon with computer programs that, when running on a computer, cause the computer to perform the method for launching an application page described above.

In a fourth aspect, embodiments of the present disclosure provide an electronic device. The electronic device includes a processor and a memory. The memory is stored with computer programs. The processor is configured to perform the method for launching an application page described above by calling the computer programs.

BRIEF DESCRIPTION OF THE DRAWINGS

In order to more clearly explain technical solutions in embodiments of the present disclosure or in the related art, drawings required to be used in description of embodiments of the present disclosure or of the related art is simply introduced below. Apparently, the drawings in the following description are merely embodiments of the present disclosure. For the ordinary skilled in the art, other drawings may be obtained based on these drawings without any creative work.

EMBODIMENTS OF THE PRESENT DISCLOSURE

Please refer to drawings, in which same reference numbers refer to same components. The principle of the present disclosure is illustrated through implementation in a suitable computing environment. The following description is based on specific embodiments of the present disclosure, which should not be interpreted as limitation to other specific embodiments of the present disclosure that are not described in detail here.

In the following description, specific embodiments of the present disclosure will be illustrated with reference to steps and symbols executed by one or more computers, unless otherwise stated. Thus, these steps and operations will be mentioned several times as being executed by the computer. In the present disclosure, being executed by the computer includes operations of a computer processor unit representing data in a structured form. The operations convert the data or maintain the data at a place in a memory system of the computer, which may be re-configured or change the operation of the computer in a way well known by testers in the art. The data structure maintained by the data is the physical position of the memory, which has specific characteristics defined by the data format. However, the principle of the present disclosure is illustrated in above words, which do not represent a limitation. Testers in the art would appreciate that, following blocks and operations may also be implemented in hardware.

The term "module" used in the present disclosure may be regarded as software object executed on the operating system. Different components, modules, engines and services described herein may be regarded as implementation objects on the operating system. Moreover, the apparatus and method described herein may be implemented in a form of software, or may be implemented on hardware, both of which are in the protection scope of the present disclosure.

Terms such as "first", "second" and "third" used in the present disclosure are used to distinguish different objects, but are not used to describe particular order. Furthermore, terms "including" and "having" and their variants intend to cover non-exclusive inclusion. For example, a process, a method, a system, a product or a device including a series of steps or modules is not limited to listed steps or modules, instead further includes steps or modules that are not listed in some embodiments, or further includes other steps or modules inherent to the process, the method, the product or the device.

"Embodiment" mentioned herein means that, particular features, structures or characteristics described in combination with the embodiment may be included in at least one embodiment of the present disclosure. This phase appeared at other places in the specification does not refer to the same embodiment, and is not exclusively dependent or alternative embodiment of other embodiments. Those skilled in the art explicitly or implicitly understand that, the embodiment described herein may be combined with other embodiments.

Embodiments of the present disclosure provide a method for launching an application page. An execution body of the method may be an apparatus for launching an application page provided by embodiments of the present disclosure, or an electronic device having the apparatus for launching the application page, in which the apparatus for launching the application page may be implemented by hardware or software. The electronic device may be a smart phone, a tablet computer, a handheld computer, a notebook computer, a desktop computer, or other computer device.

The method for launching an application page according to embodiments of the present disclosure includes: obtaining item description information in a current display interface, the item description information including text description information, image description information and/or speech description information; determining an item type of an item according to the item description information; obtaining an application identification corresponding to the item type; obtaining a configuration file corresponding to the application identification from a server, and generating a hyperlink on the current display interface, the hyperlink being associated with the configuration file; and when a trigger operation on the hyperlink is detected, launching a target application page according to the configuration file.

The apparatus for launching an application page according to embodiments of the present disclosure includes a processor and a memory configured to store instructions executable by the processor. The processor is configured to run a program corresponding to the instructions by reading the instructions stored in the memory, so as to perform: obtaining item description information in a current display interface, the item description information including text description information, image description information and/or speech description information; determining an item type of an item according to the item description information; obtaining an application identification corresponding to the item type; obtaining a configuration file corresponding to the application identification from a server, and generating a hyperlink on the current display interface, the hyperlink being associated with the configuration file; and when a trigger operation on the hyperlink is detected, launching a target application page according to the configuration file.

Figure 1:
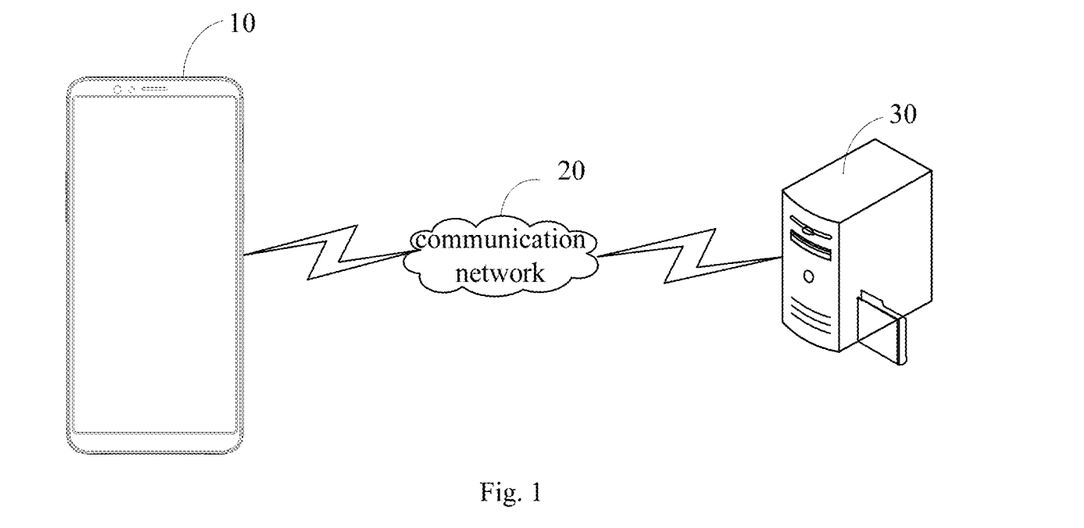
FIG. 1 is a schematic diagram of an implementation environment where a method for launching an application page according to embodiments of the present disclosure is applied.

Please refer to FIG. 1, which is a schematic diagram of an implementation environment where a method for launching an application page according to embodiments of the present disclosure is applied. As illustrated in FIG. 1, the implementation environment includes a smart phone 10, a communication network 20 and a server 30.

An operating system of the smart phone 10 may be Android system, Symbian system, or Apple system. The smart phone 10 is connected with the server 30 via the communication network 20.

The communication network 20 includes a wireless network and a wired network. The wireless network includes a combination of one or more of a wireless wide area network, a wireless local area network, a wireless metropolitan area network, and a wireless personal network.

The server 30 stores configuration files of applications. The configuration file includes data and run logic required for running the application and global configuration information. The global configuration information indicates the application consists of which pages, configures a window background color of the application page, configures a style of a navigation bar, and configures a default title, etc. In embodiments of the present disclosure, the application is a web application. The web application is a kind of application software which uses a web browser to operate on the Internet or on the Intranet, is an application program written in web language (for example, programming language, such as HTML and JavaScript), which needs to be executed through the browser. For example, the web application may be accessed through a certain open platform. The commonly known "small application" belongs to the web application. It is to be noted that, both the installation package of the "small application" and cache data generated when running the "small application" are stored in the server of the open platform. The "small application" may run in the user equipment without installation, which saves memory resource of the user equipment as much as possible. The user equipment may perform data communication with a factory server of the web application via an application interface in the open platform, to realize access to the web application. In this case, the server of the open platform serves as a proxy server, and each web application is corresponding to one application interface.

The smart phone 10 may obtain the configuration file of the application from the server 30, and generate and display a native page of the application according to the configuration file. In this way, the application may run without being installed, and data required for running the application may be obtained from the server immediately.

The server 30 may further update the configuration file of the application, to provide updated configuration file for the smart phone 10.

In an implementation, the server 30 may further store an installation file of the application, and the smart phone 10 may further obtain the installation file of the application from the server 30 and run the application completely by installing the installation file. It is easy to understand that, the server 30 may update the installation file of the application, to provide updated installation file for the smart phone 10.

Figure 2:
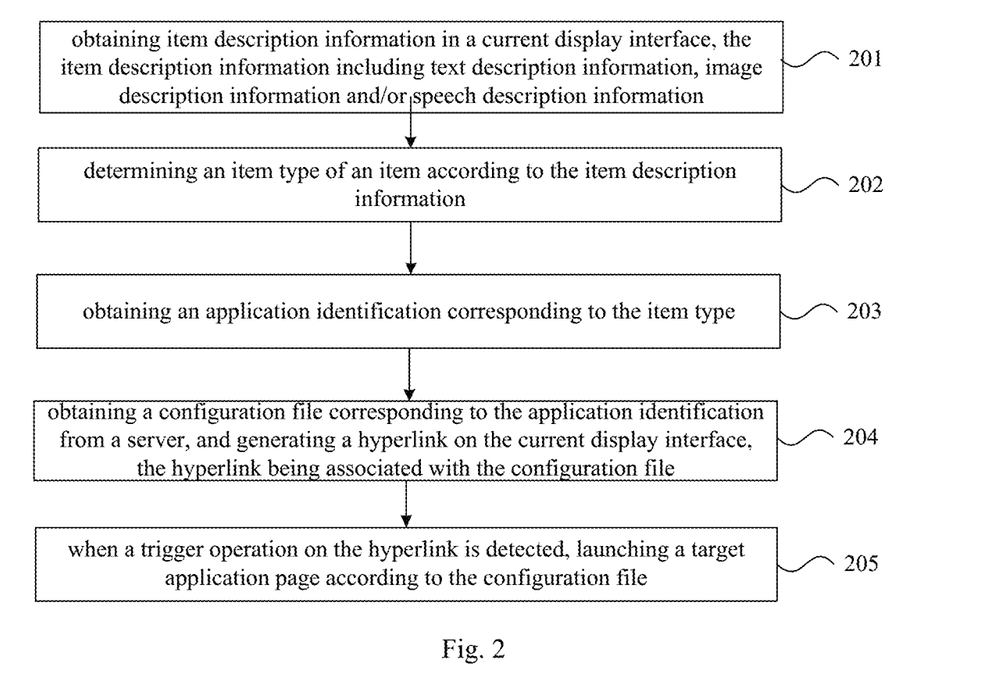
FIG. 2 is a flow chart of a method for launching an application page according to an embodiment of the present disclosure.

Referring to FIG. 2, which is a flow chart of a method for launching an application page according to an embodiment of the present disclosure, the method for launching an application page provided by an embodiment of the preset disclosure may include followings.

At block 201, item description information in a current display interface is obtained, the item description information including text description information, speech description information and image description information.

In an embodiment, the current display interface may be a current picture interface or a current video interface. It is to be understood that, the current video interface mentioned in embodiments of the present disclosure refers to a frame displayed in real time during playing video, for example, the current video interface when playing video via a video playing software, or the current video interface when playing video via a web page. In reality, the video may specifically related to an advertisement of a product, in which the product may be a tangible item that is visible and touchable.

When the user uses the electronic device to watch a video, the electronic device would obtain the item description information in the video, and automatically and intelligently analyze content in the current video interface. In detail, the electronic device may analyze the text description information in the current video interface, and may also analyze the image description information in the current video interface, and may also analyze the speech description information in the current video interface.

At block 202, an item type of the item is determined according to the item description information.

In detail, the electronic device may intelligently identify key content expressed by the item description information, and determine the item describe by the item description information according to the identified key content. Further, the item is classified according to an attribute of the item and the actual situation, to determine the item type of the item.

The item types may be set based on product manufacturers. For example, the item types may include digital product, clothing, household article and the like. In some embodiments, further subdivision may be performed. For example, the digital product may be divided into television, computer, cellphone, smart watch, camera, and the like.

At block 203, an application identification corresponding to the item type is obtained.

In embodiments of the present disclosure, a mapping relationship between item types and application identifications may be established in advance. In detail, a plurality of shopping platforms may be determined, and characteristics of each shopping platform may be analyzed, to obtain information such as main products of the platform, and main types, brands, and sellers of products. Then, the information may be synthesized to obtain the characteristics of products sold by each shopping platform. Then, the application identifications of web applications corresponding to the plurality of shopping platforms may be obtained, and association may be established between the application identifications and the characteristics of products sold by the shopping platforms. In other words, when the product characteristics are the item types, the mapping relationship between the item types and the application identifications is established, such that in later use, when the electronic device identifies the item type corresponding to the item description information, the corresponding application identification is obtained according to the mapping relationship and the item type.

At block 204, a configuration file corresponding to the application identification is obtained from a server, and a hyperlink is generated in the current display interface, in which the hyperlink is associated with the configuration file.

It is to be noted that, the server stores the configuration files corresponding to respective web applications. The configuration file includes data and run logic required for running the application and global configuration information. The global configuration information indicates the application consists of which pages, configures a window background color of the application page, configures a style of a navigation bar, and configures a default title, etc.

The electronic device sends the application identification corresponding to the item type to the server. After receiving the application identification, the server finds the configuration file matching the application identification, and returns the obtained configuration file to the electronic device.

In an implementation, the server may further store installation files of applications, in which the installation file is configured to install the corresponding application.

Further, the configuration files and the installation files are uploaded to the server by third-party providers or developers, and the third-party providers and the developers may also update and delete the configuration files and the installation files in the server.

In some embodiments, the electronic device may preset cache space of the configuration file in the storage space. When the electronic device receives the configuration file returned by the server, the electronic device caches the configuration file in the cache space. Subsequently, the electronic device may call and run the configuration file at any time.

Further, the hyperlink is generated in the current display interface, for example, the current video interface, in which the hyperlink is associated with the configuration file. The hyperlink is a specified entry to the configuration file. When the user clicks the hyperlink, the configuration file is enabled.

In an implementation, for added convenience, when an operation of long pressing the hyperlink is detected, function introduction information, permission information and other information of the corresponding application may be displayed. For example, the introduction information and the authority information may be "this shopping platform is developed and provided by XX company, and provides a shopping function for the user; this application may use the positioning permission and the camera permission".

At block 205, when a trigger operation on the hyperlink is detected, a target application page is launched according to the configuration file.

The trigger operation may be a click operation, or a press operation, which is not limited here. For example, when the click operation of the user on the hyperlink is detected, a script file in the operating system is loaded and run.

In an implementation, the script file may be a JavaScript scripting language file. JavaScript is an interpreted scripting language, has been widely used in web application developing, and is usually used to add various dynamic functions to the web page, for providing more smooth and beautiful browsing effect to the user. Typically, JavaScript script achieves functions of its own by embedding in HTML.

Based on above, the global configuration information in the configuration file is parsed by loading and running the JavaScript scripting language file to generate the native pages of the application, and the page containing the item in the native pages is displayed, so as to be launched as the target application page of the application.

In conclusion, with the method for launching the application page, the item description information in the current display interface is obtained, the item description information including text description information, image description information and speech description information, the item type of the item is determined according to the item description information, the application identification corresponding to the item type is obtained, the corresponding configuration file is obtained from the server according to the application identification, the hyperlink associated with the configuration file is generated in the current display interface, and the target application page is launched according to the configuration file when the trigger operation on the hyperlink is detected. The present disclosure determines the item type by detecting the item description information in the current display interface, further obtains the matched application, and generates the hyperlink of the application in the current display interface. Thus, in a case that the application is not installed, the application page can be launched quickly via the hyperlink, improving the efficiency of launching the application page.

Further, since the native page of the application can be launched in a case that the application is not installed, the user may perceive primary experience on the application and select whether to install the application based on the primary experience, which improves diversity of selection.

Figure 3:
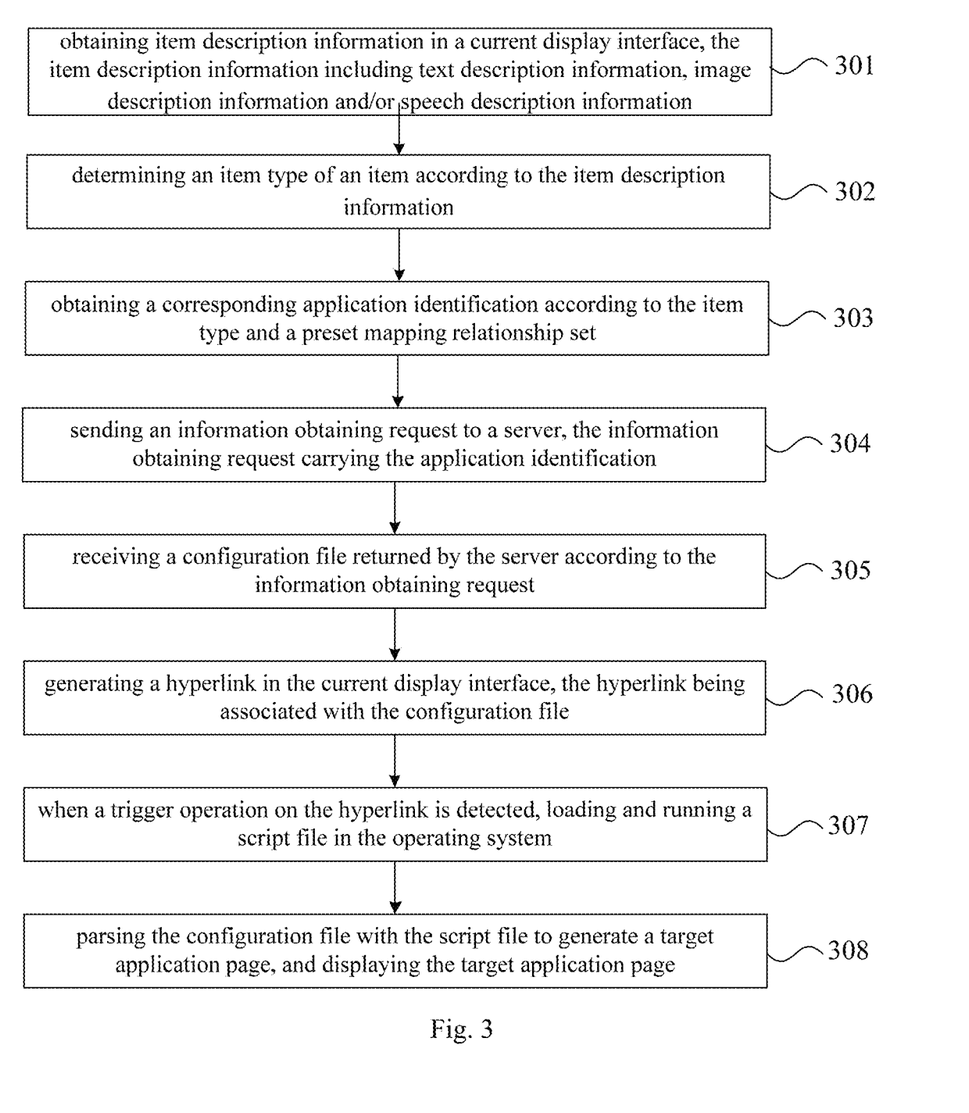
FIG. 3 is a flow chart of a method for launching an application page according to another embodiment of the present disclosure.

In the following, the method for launching the application page of the present disclosure will be further illustrated based on above embodiments. Referring to FIG. 3, the method for launching the application page may include followings.

At block 301, item description information in a current display interface is obtained, the item description information including text description information, speech description information and image description information.

In an embodiment, the current display interface may be a current picture interface or a current video interface. It is to be understood that, the current video interface mentioned in embodiments of the present disclosure refers to a frame displayed in real time during playing video, for example, the current video interface when playing video via a video playing software, or the current video interface when playing video via a web page. In reality, the video may specifically related to an advertisement of a product, in which the product may be a tangible item that is visible and touchable.

When the user uses the electronic device to watch a video, the electronic device would obtain the item description information in the video, and automatically and intelligently analyze content in the current video interface. In detail, the electronic device may analyze the text description information in the current video interface, and may also analyze the image description information in the current video interface, and may also analyze the speech description information in the current video interface.

Figure 4:
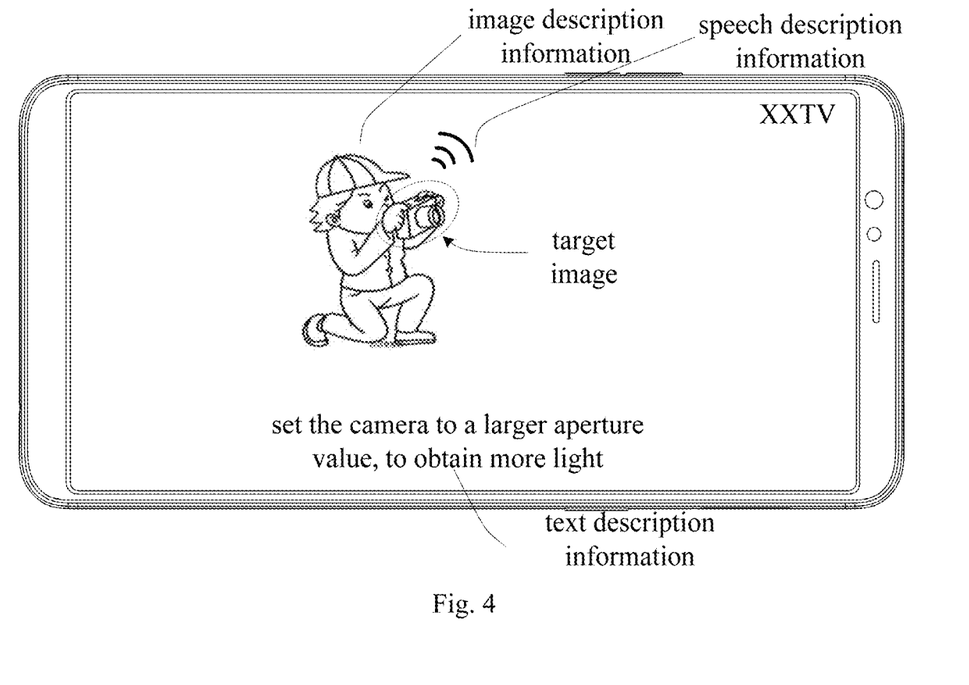
FIG. 4 is a schematic diagram illustrating an application scenario where a method for launching an application page according to an embodiment of the present disclosure is applied.

For example, referring to FIG. 4, which shows a video playing interface, it can be clearly seen that, the video interface includes the text description information, the speech description information and the image description information.

At block 302, an item type of the item is determined according to the item description information.

In some embodiments, when the item description information is the text description information, the text information is matched with preset keywords in a database, and words in the text information consistent with the preset keyword is determined as target text information.

It is to be noted that, since each application has the corresponding using habit, each application has the corresponding using keyword. For example, refer to "camera" in the text description information as illustrated in FIG. 4.

The application identification of each application is mapped to the preset keyword (the using keyword), and stored in the database. The application identification may be an application name of the application.

Further, the obtained text description information is matched with the preset keywords in the database, and the word in the text description information consistent with the preset keyword is determined as the keyword.

In some embodiments, when the item description information is the speech description information, determining the item type of the item according to the item description information may include:

recognizing speech content in the speech description information;

converting the speech content into text information;

selecting a sample keyword matching the text information from a preset database; and determining the item type of the item according to the sample keyword.

In detail, when the user uses the electronic device to display the video interface, the electronic device would automatically and intelligently analyze the content in the current video interface. For example, the electronic device may perform MFCC feature extraction on speech in the current video interface, and perform speech recognition according to the extracted features, to further extract the text information contained in the speech. The speech recognition here is a mature technology, and will not be elaborated.

In some embodiments, when the item description information is the image description information, determining the item type of the item according to the item description information may include:

obtaining a target image including the item from the image description information;

extracting image features of the target image; and determining the item type of the item according to the image features.

The image features may include color feature, shape feature, textural feature, and spatial relationship feature. The obtained image features are matched with sample image features in the preset database, such that the item is identified according to the matched sample image features, and the item type of the item is further determined.

At block 303, a corresponding application identification is obtained according to the item type and a preset mapping relationship set, the mapping relationship set including mapping relationship between sample item types and sample application identifications.

In detail, the target sample item type matching the item type is obtained from the preset mapping relationship set, and the sample application identification corresponding to the target sample item type is obtained to be determined as the application identification corresponding to the item type.

At block 304, an information obtaining request is sent to a server, the information obtaining request carrying the application identification.

In detail, the information obtaining request may be sent to the server based on a wireless network. The wireless network may be a combination of one or more of a wireless wide area network, a wireless local area network, a wireless metropolitan area network, and a wireless personal network.

At block 305, a configuration file returned by the server according to the information obtaining request is received.

It is to be noted that, the server stores the configuration files corresponding to respective applications. The configuration file includes data and run logic required for running the application and global configuration information. The global configuration information indicates the application consists of which pages, configures a window background color of the application page, configures a style of a navigation bar, and configures a default title, etc.

The electronic device sends the application identification corresponding to the target text information to the server. After receiving the application identification, the server finds the configuration file matching the application identification, and returns the obtained configuration file to the electronic device.

In an implementation, the server may further store installation files of applications, in which the installation file is configured to install the corresponding application.

Further, the configuration files and the installation files are uploaded to the server by third-party providers or developers, and the third-party providers and the developers may also update and delete the configuration files and the installation files in the server.

At block 306, a hyperlink is generated in the current display interface, in which the hyperlink is associated with the configuration file.

Figure 5:
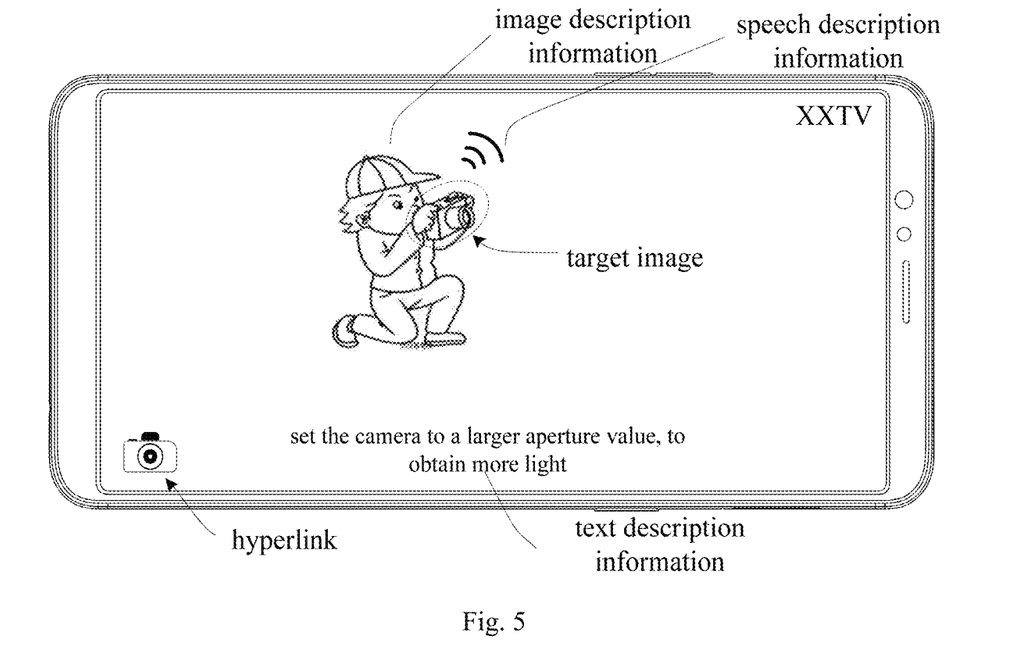
FIG. 5 is a schematic diagram illustrating another application scenario where a method for launching an application page according to an embodiment of the present disclosure is applied.

In detail, the hyperlink is generated in the current display interface, in which the hyperlink is associated with the configuration file. The hyperlink is a specified entry to the configuration file. When the user clicks the hyperlink, the configuration file is enabled. For example, referring to FIG. 5, a hyperlink of a camera icon is generated in the lower left corner.

In an implementation, for added convenience, when an operation of long pressing the hyperlink is detected, function introduction information, permission information and other information of the corresponding application may be displayed. For example, the introduction information and the authority information may be "this shopping platform is developed and provided by XX company, and provides a shopping function for the user; this application may use the positioning permission and the camera permission".

The application identification corresponding to the preset keyword is obtained, and the target text information is associated with the application identification.

When it is detected that there is a word consistent with the preset keyword in the text information, and the word is determined as the target text information, the application identification corresponding to the target text information is obtained, and the target text information is associated with the application identification.

The electronic device may preset cache space of the configuration file in the storage space. When the electronic device receives the configuration file returned by the server, the electronic device caches the configuration file in the cache space. Subsequently, the electronic device may call and run the configuration file at any time. Content in the cache space may be cleared when the electronic device is powered off.

At block 307, when a trigger operation on the hyperlink is detected, a script file in the operating system is loaded and run.

The trigger operation may be a single click operation, a double click operation, or a press operation, which is not limited here. For example, when the single click operation of the user on the hyperlink is detected, the script file in the operating system is loaded and run.

At block 308, the configuration file is parsed with the script file to generate a target application page, and the target application page is displayed.

The script file may be a JavaScript scripting language file. The global configuration information in the configuration file is parsed by loading and running the JavaScript scripting language file. Display elements obtained from parsing are converted to a native view. Page rendering is performed on the native view dynamically to be obtain the native page, and the native page is displayed.

In an implementation, after displaying the native page, corresponding search may be performed according to the target text information. Thus, the user does not need to input the keyword manually.

Figure 6:
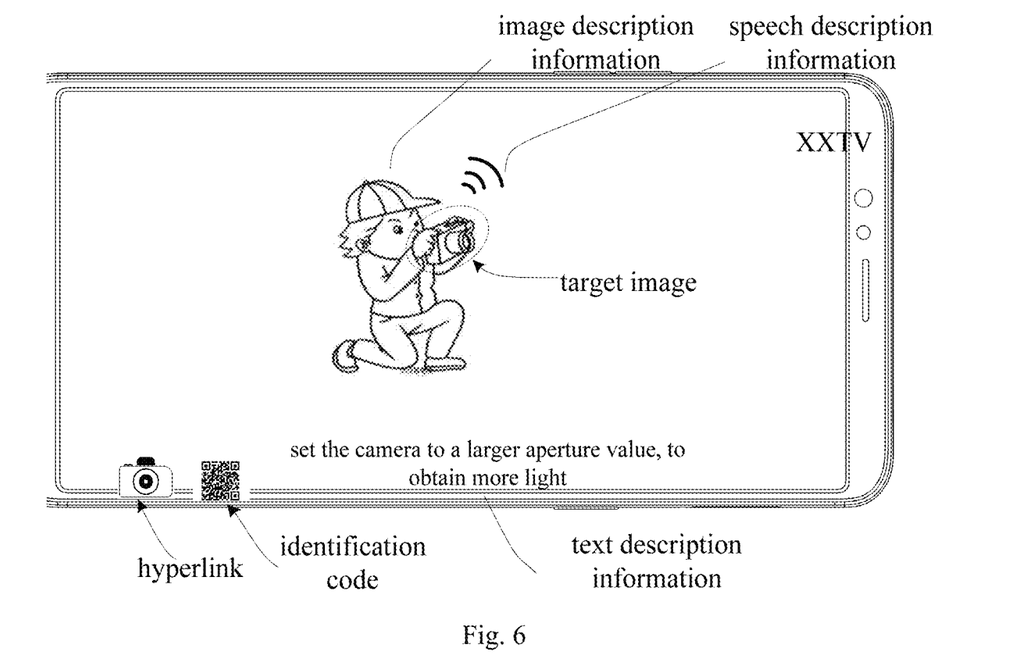
FIG. 6 is a schematic diagram illustrating yet another application scenario where a method for launching an application page according to an embodiment of the present disclosure is applied.
Figure 7:
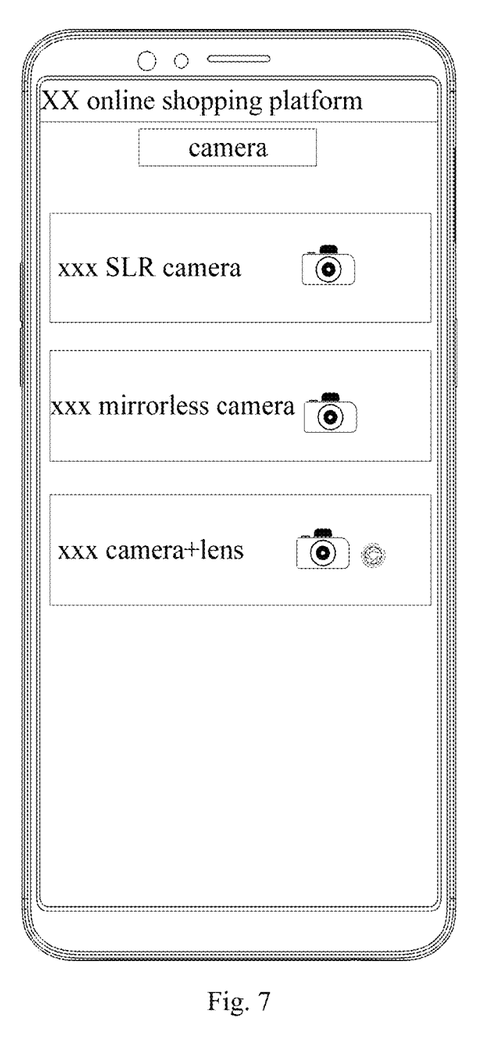
FIG. 7 is a schematic diagram illustrating still another application scenario where a method for launching an application page according to an embodiment of the present disclosure is applied.

For example, as illustrated in FIG. 6, when the single click operation on the hyperlink ("camera" icon) is detected, the script file in the operating system is loaded and run, and the global configuration information in the configuration file of the corresponding "XX shopping platform" is parsed with the script file. As illustrated in FIG. 7, the application page of "XX shopping platform" is generated, and corresponding search is performed according to the target text information "camera", to obtain search results of "xxx SLR camera", "xxx mirrorless camera" and "xxx camera+lens". Based on this, the user may select and buy the expected product.

In some embodiments, an identification code may be generated in the current video interface based on the application identification, such that when the identification code is identified successfully, the corresponding configuration file is obtained from the server for launching the target application page. In this way, the identification code may be scanned using the camera function of another electronic device when the user is watching the video, realizing launching the application page of the corresponding shopping platform. During the above process, the user may continue watching the video without interruption, and moreover the user will not miss the item of interest.

As illustrated in FIG. 6, the identification code may be a QR code, and may be generated beside the hyperlink, such that the user or other users may download the configuration file from the server by using the scanning function of the electronic device, thus realizing launching the application page of the corresponding shopping platform.

In conclusion, the present disclosure determines the item type by detecting the item description information in the current display interface, further obtains the matched application, and generates the hyperlink of the application in the current display interface. Thus, in a case that the application is not installed, the application page can be launched quickly via the hyperlink, improving the efficiency of launching the application page.

Further, since the native page of the application can be launched in a case that the application is not installed, the user may perceive primary experience on the application and select whether to install the application based on the primary experience, which improves diversity of selection.

Figure 8:
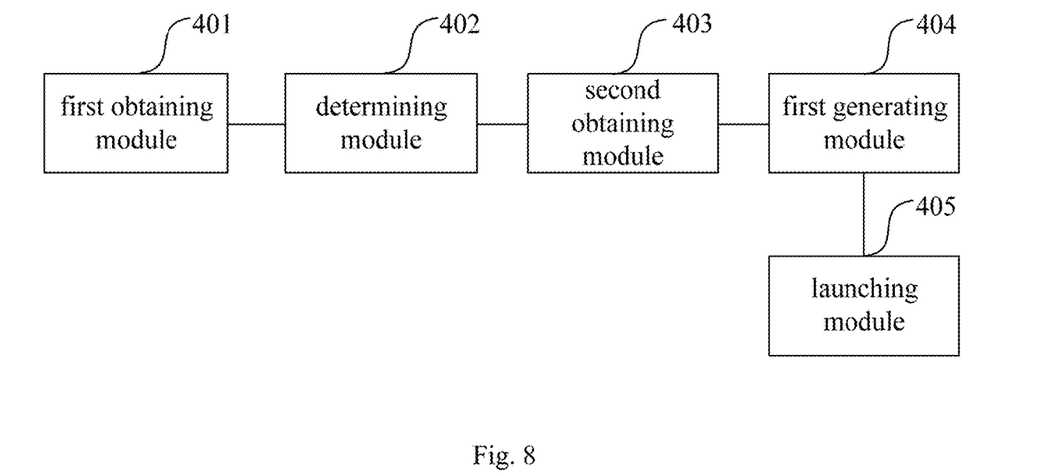
FIG. 8 is a block diagram of an apparatus for launching an application page according to an embodiment of the present disclosure.

In an embodiment, an apparatus for launching an application page is provided. Referring to FIG. 8, which is a block diagram of an apparatus for launching an application page according to an embodiment of the present disclosure, the apparatus is applicable to an electronic device, and includes a first obtaining module 401, a determining module 402, a second obtaining module 403, a first generating module 404 and a launching module 405.

The first obtaining module 401 is configured to obtain item description information in a current display interface, the item description information including text description information, image description information and/or speech description information.

The determining module 402 is configured to determine an item type of an item according to the item description information.

The second obtaining module 403 is configured to obtain an application identification corresponding to the item type.

The first generating module 404 is configured to obtain a configuration file corresponding to the application identification from a server, and generate a hyperlink on the current display interface, the hyperlink being associated with the configuration file.

The launching module 405 is configured to launch a target application page according to the configuration file when a trigger operation on the hyperlink is detected.

Figure 9:
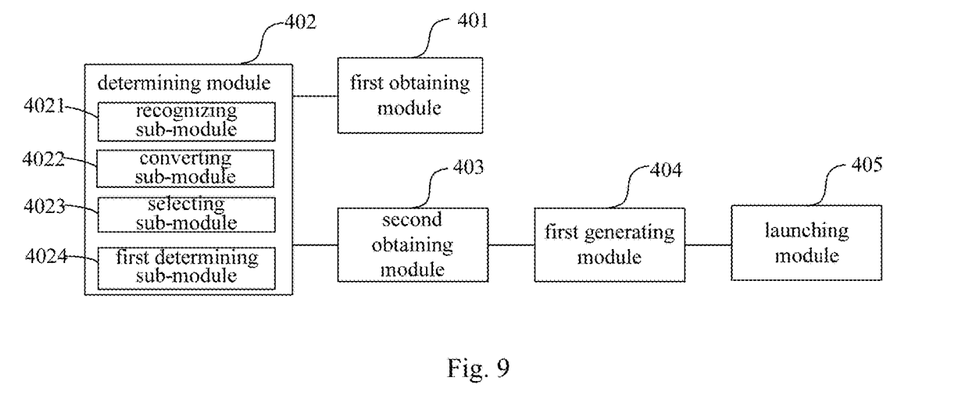
FIG. 9 is block diagram of an apparatus for launching an application page according to another embodiment of the present disclosure.

In some embodiments, the item description information is speech description information. Referring to FIG. 9, the determining module 402 includes a recognizing sub-module 4021, a converting sub-module 4022, a selecting sub-module 4023 and a first determining sub-module 4024.

The recognizing sub-module 4021 is configured to recognize speech content in the speech description information.

The converting sub-module 4022 is configured to convert the speech content into text content.

The selecting sub-module 4023 is configured to select a sample keyword matching the text content from a preset database.

The first determining sub-module 4024 is configured to determine the item type according to the sample keyword.

Figure 10:
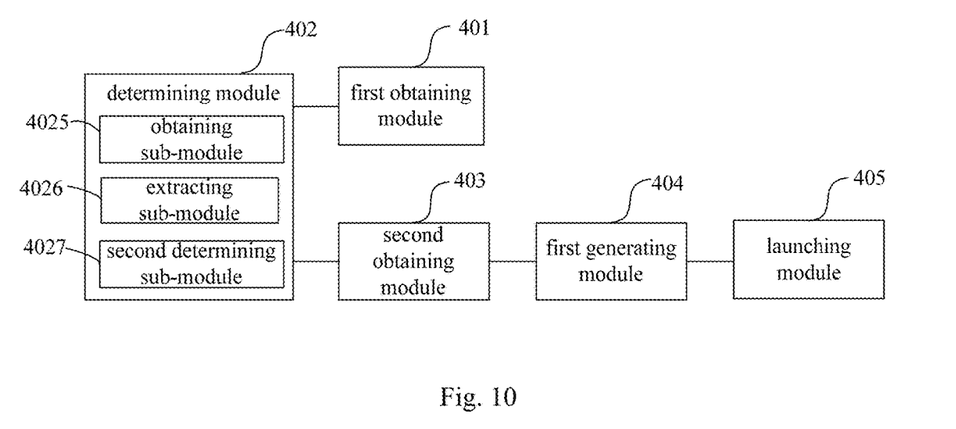
FIG. 10 is a block diagram of an apparatus for launching an application page according to yet another embodiment of the present disclosure.

In some embodiments, the item description information is image description information. Referring to FIG. 10, the determining module 402 includes an obtaining sub-module 4025, an extracting sub-module 4026 and a second determining sub-module 4027.

The obtaining sub-module 4025 is configured to obtain a target image containing the item from the image description information.

The extracting sub-module 4026 is configured to extract image features of the target image.

The second determining sub-module 4027 is configured to determine the item type of the item according to the image features.

Figure 11:
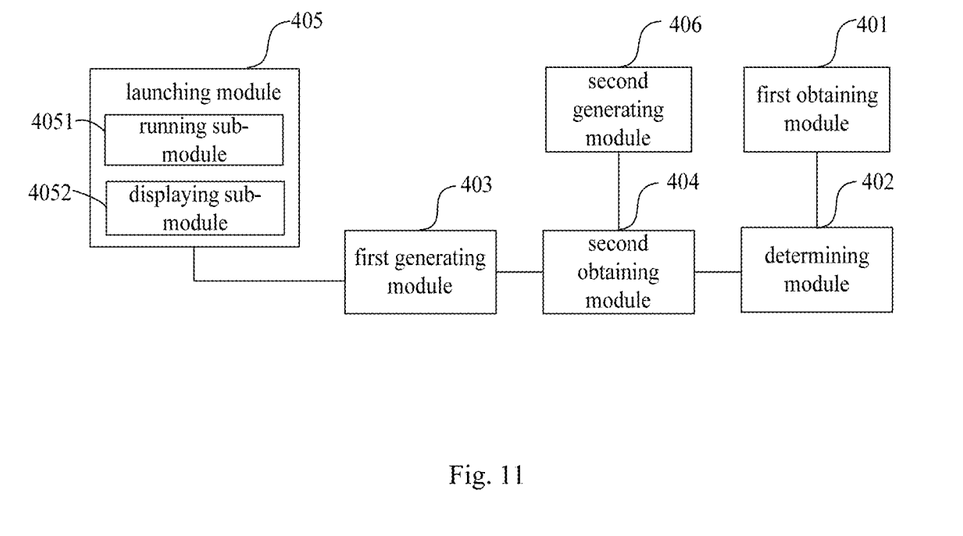
FIG. 11 is a block diagram of an apparatus for launching an application page according to still yet another embodiment of the present disclosure.

In some embodiments, referring to FIG. 11, the apparatus further includes a second generating module 406.

The second generating module 406 is configured to generate an identification code in the current display interface based on the application identification, such that when the identification code is identified successfully, the configuration file is obtained from the server for launching the target application page.

In some embodiments, the configuration file includes global configuration information describing the application page. Referring to FIG. 11, the launching module 405 may include a running sub-module 4051 and a displaying sub-module 4052.

The running sub-module 4051 is configured to load and run a script file in the operating system when the trigger operation on the hyperlink is detected.

The displaying sub-module 4052 is configured to parse the global configuration information with the script file to generate the target application file, and display the target application file.

In specific implementation, above modules may be implemented as separate entities, or may be combined arbitrarily to be implemented as a single entity or several entities. Specific implementation of above modules may refer to foregoing embodiments, which will not be elaborated here.

In conclusion, the apparatus for launching the application page provided by this embodiment detects the text information in the display interface, and automatically generates the hyperlink of the application according to the text information. In a case that the application is not installed, the application page can be quickly launched via the hyperlink, which improves the efficiency of launching the application page.

Figure 12:
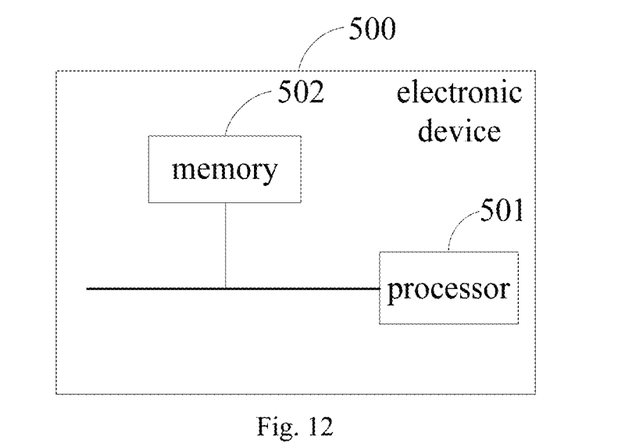
FIG. 12 is a block diagram of an electronic device according to an embodiment of the present disclosure.

Embodiments of the present disclosure further provide an electronic device. Referring to FIG. 12, the electronic device 500 includes a processor 501 and a memory 502. The processor 501 is electrically connected with the memory 502.

The processor 500 is a control center of the electronic device 500, is connected with various parts of the electronic device via various interfaces and lines, and executes various functions of the electronic device 500 and processes data by running or loading computer programs stored in the memory 502 and calling the data stored in the memory 502, realizing overall monitoring of the electronic device.

The memory 502 may be configured to store software programs and modules. The processor 501 executes various function applications and processes data by running the computer programs and modules stored in the memory 502. The memory 502 may mainly include a program storage region, and a data storage region. The program storage region may store the operating system, computer programs required by at least one functions (for example, a sound playback function, an image playback function, etc.), and the like. The data storage region may store data established according to usage of the electronic device. In addition, the memory 502 may include a high speed random access memory, or may include a non-volatile memory, for example at least one disk memory device, flash memory device, or other volatile solid storage devices. Accordingly, the memory 502 may further include a memory controller, for providing access of the processor 501 to the memory 502.

In embodiments of the present disclosure, the processor 501 in the electronic device 500 may load the instructions corresponding to one or more computer programs into the memory 502, and runs the computer programs stored in the memory 502 to realize various functions, as follows:

obtaining item description information in a current display interface, the item description information including text description information, image description information and/or speech description information;

determining an item type of an item according to the item description information;

obtaining an application identification corresponding to the item type;

obtaining a configuration file corresponding to the application identification from a server, and generating a hyperlink on the current display interface, the hyperlink being associated with the configuration file; and when a trigger operation on the hyperlink is detected, launching a target application page according to the configuration file.

In some embodiments, the item description information is speech description information, and the processor 501 is configured to perform:

recognizing speech content in the speech description information;

converting the speech content into text content;

selecting a sample keyword matching the text content from a preset database; and determining the item type according to the sample keyword.

In some embodiments, the item description information is image description information, and the processor 502 is configured to perform:

obtaining a target image comprising the item from the image description information;

extracting image features of the target image; and determining the item type of the item according to the image features.

In some embodiments, the processor 502 is further configured to perform:

generating an identification code in the current display interface based on the application identification, such that when the identification code is identified successfully, the configuration file is obtained from the server for launching the target application page.

In some embodiments, the configuration file includes global configuration information describing the application page, and the processor 502 is configured to perform:

when the trigger operation on the hyperlink is detected, loading and running a script file in the operating system; and parsing the global configuration information with the script file to generate the target application file, and displaying the target application file.

The present disclosure determines the item type by detecting the item description information in the current display interface, further obtains the matched application, and generates the hyperlink of the application in the current display interface. Thus, in a case that the application is not installed, the application page can be launched quickly via the hyperlink, improving the efficiency of launching the application page.

Figure 13:
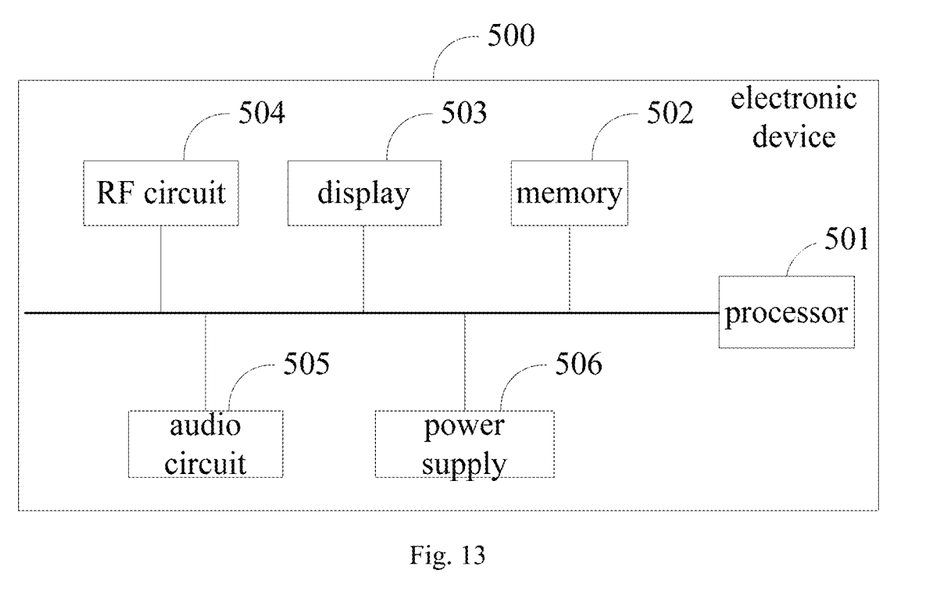
FIG. 13 is a block diagram of an electronic device according to another embodiment of the present disclosure.

Referring to FIG. 13 together, in some implementations, the electronic device 500 may further include a display 503, a RF circuit 504, an audio circuit 505 and a power supply 506. The display 503, the RF circuit 504, the audio circuit 505 and the power supply are electrically connected with the processor 501.

The display 503 may be configured to display information input by the user or information provided to the user and various graphic user interfaces. These graphic user interfaces may consist of graphs, text, icons, videos and any combination thereof. The display 503 may include a display panel, which may be configured in a form of LCD (Liquid Crystal Display) or OLED (Organic Light-Emitting Diode) in some implementations.

The RF circuit 504 may be configured to transmit and receive RF signals, to establish wireless communication with a network device or other electronic devices, and transmit signals to and receive signals from the network device or other electronic devices.

The audio circuit 505 may be configured to provide an audio interface between the user and the electronic device via a speaker or a microphone.

The power supply 506 may be configured to supply power for respective parts of the electronic device 500. In some embodiments, the power supply 506 may be logically connected with the processor 501 via a power management system, such that functions such as charging and discharging management and power management may be realized through the power management system.

Although not shown in FIG. 13, the electronic device 500 may further include a camera, a Bluetooth module, and the like, which will not be elaborated here.

Embodiments of the present disclosure further provide a storage medium. The storage medium is stored with computer programs that, when running on a computer, cause the computer to perform the method for launching the application page in any of above embodiments, for example: obtaining item description information in a current display interface, the item description information including text description information, image description information and/or speech description information; determining an item type of an item according to the item description information; obtaining an application identification corresponding to the item type; obtaining a configuration file corresponding to the application identification from a server, and generating a hyperlink on the current display interface, the hyperlink being associated with the configuration file; and when a trigger operation on the hyperlink is detected, launching a target application page according to the configuration file.

In embodiments of the present disclosure, the storage medium may be a diskette, a CD, a RAM (Random Access Memory), a ROM (Read Only Memory), or the like.

Description of above embodiments focuses differently. For the part which is not described in detail in a certain embodiment, reference may be made to related description in other embodiments.

It is to be noted that, with respect to the method for launching the application page according to embodiments of the present disclosure, those skilled in the art may understand that, all or a part of procedures of the method for opening the file according to embodiments of the present disclosure may be implemented by controlling related hardware through computer programs. The computer programs may be stored in a computer readable storage medium, for example, is stored in a memory of an electronic device, and is executed by at least one processor in the electronic device, the execution process of which may include the process of the method for opening the file. The storage medium may be a diskette, a CD, a ROM, a RAM and the like.

With respect to the apparatus for launching the application page according to embodiments of the present disclosure, respective function modules may be integrated into one processing chip, or respective function modules may exist physically separately, or two or more modules may be integrated into one module. The integrated module may be implemented in a form of hardware, or may be implemented in a form of software function module. When the integrated module is implemented in the form of software function module, the integrated module may be sold or used as a separate product, or may be stored in a computer readable storage medium, which may be a ROM, a disk or a CD.

The method and apparatus for launching the application page, the storage medium and the electronic device provided by embodiments of the present disclosure have been described in detail above. Specific examples have been adopted herein to explain the principle and implementations of the present disclosure. Above embodiments are merely illustrated to help understanding of the present method and the core idea thereof. Moreover, for those skilled in the art, specific implementations and application scope may vary based on the idea of the present disclosure. In conclusion, content of the specification should not be interpreted as limitation to the present disclosure.

What is claimed is:

1. A method for launching an application page, applicable to an electronic device, and comprising:
    obtaining item description information in a current display interface, the item description information comprising text description information, image description information and/or speech description information;
    determining an item type of an item according to the item description information;
    obtaining an application identification corresponding to the item type and a preset mapping relationship set, wherein the preset mapping relationship set comprises mapping relationships between sample item types and sample application identifications;
    obtaining a configuration file corresponding to the application identification from a server, and generating a hyperlink on the current display interface, the hyperlink being associated with the configuration file; and
    launching a target application page according to the configuration file when a trigger operation on the hyperlink is detected, wherein, an application corresponding to the target application page operates on Internet or Intranet and is not installed on the electronic device, and the configuration file comprises data and run logic required for running the application corresponding to the target application page.

2. The method according to claim 1, wherein the item description information is speech description information;
    determining the item type of the item according to the item description information comprises:
        recognizing speech content in the speech description information;
        converting the speech content into text content;
        selecting a sample keyword matching the text content from a preset database; and
        determining the item type according to the sample keyword.

3. The method according to claim 2, further comprising:
    performing search according to the sample keyword matching the text content automatically after launching the target application page.

4. The method according to claim 1, wherein the item description information is image description information;
    determining the item type of the item according to the item description information comprises:
        obtaining a target image comprising the item from the image description information;
        extracting image features of the target image; and
        determining the item type of the item according to the image features.

5. The method according to claim 1, further comprising:
    generating an identification code in the current display interface based on the application identification, such that when the identification code is identified successfully, the configuration file is obtained from the server for launching the target application page.

6. The method according to claim 1, wherein the configuration file comprises global configuration information describing the application page;
    launching the target application page according to the configuration file when the trigger operation on the hyperlink is detected comprises:
        loading and running a script file in an operating system when the trigger operation on the hyperlink is detected; and
        parsing the global configuration information with the script file to generate the target application file, and displaying the target application file.

7. The method according to claim 1, further comprising:
    caching the configuration file in a cache space after obtaining the configuration file.

8. The method according to claim 7, further comprising:
    clearing the cache space when the electronic device is powered off.

9. An apparatus for launching an application page, applicable to an electronic device, and comprising:
    a processor; and
    a memory, configured to store instructions executable by the processor,
    wherein the processor is configured to run a program corresponding to the instructions by reading the instructions stored in the memory, so as to perform:
        obtaining item description information in a current display interface, the item description information comprising text description information, image description information and/or speech description information;
        determining an item type of an item according to the item description information;
        obtaining an application identification corresponding to the item type and a preset mapping relationship set, wherein the preset mapping relationship set comprises mapping relationships between sample item types and sample application identifications;
        obtaining a configuration file corresponding to the application identification from a server, and generating a hyperlink on the current display interface, the hyperlink being associated with the configuration file; and
        launching a target application page according to the configuration file when a trigger operation on the hyperlink is detected, wherein, an application corresponding to the target application page operates on Internet or Intranet and is not installed on the electronic device, and the configuration file comprises data and run logic required for running the application corresponding to the target application page.

10. The apparatus according to claim 9, wherein the item description information is speech description information;
    the processor is configured to perform:
        recognizing speech content in the speech description information;
        converting the speech content into text content;
        selecting a sample keyword matching the text content from a preset database; and determining the item type according to the sample keyword.

11. The apparatus according to claim 10, wherein the processor is further configured to perform:
performing search according to the sample keyword matching the text content automatically after launching the target application page.

12. The apparatus according to claim 9, wherein the item description information is image description information;
the processor is configured to perform:
obtaining a target image comprising the item from the image description information;
extracting image features of the target image; and
determining the item type of the item according to the image features.

13. The apparatus according to claim 9, wherein the processor is further configured to perform:
generating an identification code in the current display interface based on the application identification, such that when the identification code is identified successfully, the configuration file is obtained from the server for launching the target application page.

14. The apparatus according to claim 9, wherein the configuration file comprises global configuration information describing the application page;
the processor is configured to perform:
loading and running a script file in an operating system when the trigger operation on the hyperlink is detected; and
parsing the global configuration information with the script file to generate the target application file, and displaying the target application file.

15. The apparatus according to claim 9, wherein the processor is further configured to perform:
caching the configuration file in a cache space after obtaining the configuration file.

16. The apparatus according to claim 15, wherein the processor is further configured to perform:
clearing the cache space when the electronic device is powered off.

17. An electronic device, comprising a processor, a memory and a display, wherein the memory is stored with computer programs, the display is configured to receive inputted information and display outputted information, and the processor is configured to perform a method for launching an application page by calling the computer programs, the method comprising:
obtaining item description information in a current display interface, the item description information comprising text description information, image description information and/or speech description information;
determining an item type of an item according to the item description information;
obtaining an application identification corresponding to the item type and a preset mapping relationship set, wherein the preset mapping relationship set comprises mapping relationships between sample item types and sample application identifications;
obtaining a configuration file corresponding to the application identification from a server, and generating a hyperlink on the current display interface, the hyperlink being associated with the configuration file; and
launching a target application page according to the configuration file when a trigger operation on the hyperlink is detected, wherein, an application corresponding to the target application page operates on Internet or Intranet and is not installed on the electronic device, and the configuration file comprises data and run logic required for running the application corresponding to the target application page.

18. The electronic device according to claim 17, wherein the electronic device comprises at least one of a smart phone, a tablet computer, a personal digital assistant and a wearable device.

* * * * *